United States Patent [19]

Nomura et al.

[11] Patent Number: 4,941,322

[45] Date of Patent: Jul. 17, 1990

[54] TANDEM MASTER CYLINDER WITH VALVED HYDRAULIC POWER BOOSTER FLUID PASSAGE IN PISTON

[75] Inventors: Yoshihisa Nomura; Noboru Noguchi, both of Toyota, Japan

[73] Assignee: Toyota Jidosha Kabushiki Kaisha, Japan

[21] Appl. No.: 208,585

[22] Filed: Jun. 20, 1988

[30] Foreign Application Priority Data

Jun. 25, 1987 [JP] Japan .................... 62-158157

[51] Int. Cl.$^5$ ................... B60T 13/14; B60T 13/58; B60T 8/44
[52] U.S. Cl. ................... 60/547.1; 60/563; 60/589
[58] Field of Search ............ 60/547.1, 550, 565, 60/562–564, 589, 574, 576

[56] References Cited

U.S. PATENT DOCUMENTS

| | | | |
|---|---|---|---|
| 2,992,533 | 7/1961 | Hodkinson | 60/565 X |
| 4,641,497 | 2/1987 | Kervagoret | 60/563 |
| 4,642,989 | 2/1987 | Belart | 60/565 X |
| 4,707,989 | 11/1987 | Nakamura et al. | 60/562 X |
| 4,783,128 | 11/1988 | Resch | 60/562 X |
| 4,805,966 | 2/1989 | Reinartz et al. | 60/563 X |

FOREIGN PATENT DOCUMENTS 8144 1/1985 Japan.
38243 2/1985 Japan.

Primary Examiner—Robert E. Garrett
Assistant Examiner—George Kapsalas
Attorney, Agent, or Firm—Oliff & Berridge

[57] ABSTRACT

A hydraulic braking system having an auxiliary piston disposed between an input piston and a presser piston, so as to define a first power chamber between the auxiliary and presser pistons, and a second power chamber between the input and auxiliary pistons. The presser piston cooperates with a housing to define a pressure chamber connected to a first braking arrangement. The first power chamber is connected to a second braking arrangement and supplied with a power pressure from an external hydraulic source through a control valve and the second power chamber. The system includes a connecting mechanism connecting the auxiliary and presser pistons such that the two pistons are normally placed in a spaced-apart state but are abuttable on each other. The system also includes a valve device disposed in a passage formed through the auxiliary piston, so as to inhibit a fluid flow from the first power chamber to the second power chamber when the input and auxiliary pistons are advanced as a unit in abutting relation with each other, and permit fluid flows in both directions between the two power chambers when these pistons are placed in other conditions. The system is capable of activating the first and second braking arrangements by an operating force acting on the input piston through a manually operated mechanism, in the event of a power failure in the second power chamber or external hydraulic source.

21 Claims, 5 Drawing Sheets

TANDEM MASTER CYLINDER WITH VALVED HYDRAULIC POWER BOOSTER FLUID PASSAGE IN PISTON

BACKGROUND OF THE INVENTION

1. Field of the Invention

The present invention relates to a hydraulically operated braking system equipped with a hydraulic booster, for a motor vehicle, and more particularly to improvements in connection with a technique for manually producing a fluid pressure in the event of a failure of an external hydraulic power source or related components.

2. Discussion of the Prior Art

A hydraulically operated braking system with a hydraulic booster for an automotive vehicle is known according to laid-open publication Nos. 60-8144 and 60-38243 (published in 1985) of unexamined Japanese Patent Applications. In the braking system disclosed in these publications, a presser piston, and an input piston operated by a brake operating mechanism are fluid tightly and slidably fitted in a housing so as to define a pressure chamber in front of the presser piston, and a power chamber between the presser and input pistons. The power chamber is supplied with a brake fluid which is delivered from an external hydraulic power source, through a control valve which is operated in response to a relative movement between the presser and input pistons. Thus, a power pressure in the power chamber is controlled. The pressure chamber is connected to brake cylinders of a first braking arrangement, while the power chamber is connected to brake cylinders of a second braking arrangement.

In the hydraulic braking system of the type discussed above, the power pressure applied to the hydraulic booster from the external hydraulic power source through the control valve is directly transmitted to the brake cylinders of the second braking arrangement, as long as the external hydraulic power source, control valve or other related components are normally functioning or intact. At the same time, the power pressure activates the presser piston, whereby a fluid pressure is produced in the pressure chamber and is transmitted to the brake cylinders of the first braking arrangement.

In the event that the power pressure cannot be delivered to the hydraulic booster upon failure of the external hydraulic power source or related components, the fluid pressure in the brake cylinders of the second braking arrangement is not raised by an operating action of the brake operating mechanism. However, when the input piston has been advanced a distance exceeding a predetermined value as a result of the operation of the brake operating mechanism, the input piston comes into abutting contact with the presser piston, whereby an operating force acting on the brake operating mechanism is mechanically imparted to the presser piston through the input piston. That is, the presser piston is activated by the brake operating force, rather than the power pressure of the external hydraulic power source, whereby a fluid pressure is produced in the pressure chamber. Thus, only the brake cylinders of the first braking arrangement are designed operable, irrespective or even in the event of an occurrence of a failure or trouble of the external hydraulic power source or related components.

As described above, the rotating motions of the vehicle wheels corresponding to the brake cylinders of the first braking arrangement can be restrained by the fluid pressures developed in these brake cylinders, even in the event of a failure of the external hydraulic power source or related components. However, the overall braking capability of the braking system for the vehicle as a whole is reduced, since only the first braking arrangement is operable. This undesirably requires the vehicle driver exert an increased operating force on the brake operating mechanism.

To compensate for the reduced braking effect upon failure of the external hydraulic power source, it is proposed to provide the brakes with friction members which have a high coefficient of friction. On the other hand, it is desirable to minimize the coefficient of friction of the friction members, from the standpoint of avoiding squealing noises and vibrations of the brakes. Inspite of this desire, the brakes should employ the friction members with a high friction coefficient, in order to obtain a sufficient braking force even in the event of a trouble as indicated above.

SUMMARY OF THE INVENTION

It is therefore an object of the present invention to provide a hydraulically operated braking system wherein the brake cylinders of both of the first and second braking arrangement can be activated by an operating force which acts on the brake operating mechanism, even where a power pressure cannot be obtained due to a failure or trouble of an external hydraulic power source and/or related components.

The above object may be achieved according to the principle of the present invention, which provides a hydraulically operated braking system which includes the housing, pressure piston, brake operating mechanism, input piston, external hydraulic power source, control valve, and at least one brake cylinder of the first braking arrangement, and at least one brake cylinder of the second braking system, which have been described above, the braking system being characterized in that: an auxiliary piston is fluid tightly and slidably fitted in the housing such that the power chamber is divided into a first chamber between the presser and auxiliary pistons, and a second chamber between the auxiliary and input pistons; a connecting mechanism is provided to connect the auxiliary and presser pistons such that the connecting mechanism permits the auxiliary piston to approach the presser piston, and such that the auxiliary and presser pistons are normally spaced apart from each other by a predetermined maximum distance; the auxiliary piston has a communication passage formed therethrough for fluid communication between the first and second chambers; a valve device is provided in the communication passage. The valve device is adapted to inhibit a flow of the brake fluid in a direction from the first chamber to the second chamber, in a first state of the auxiliary and input pistons in which the auxiliary and input pistons are advanced as a unit in abutting contact with each other. The valve device permits flows of the brake fluid in opposite directions between the first and second chambers, in a second state of the auxiliary and input pistons other than the first state. The above-indicated at least one brake cylinder of the second braking arrangement is connected to the first chamber, whereby the brake cylinder or cylinders of the first braking arrangement and the brake cylinder or cylinders of the second braking arrangement are activated by an operating force acting on the brake operating mechanism, which is imparted to the auxiliary piston through the input piston, when the power pressure is not obtained in the power chamber.

In the hydraulically operated braking system of the present invention constructed as described above, the input piston is advanced by a slight amount of operation of the brake operating mechanism. In the presence of the predetermined clearance or maximum spacing distance between the input and auxiliary pistons, the slight operation of the brake operating mechanism does not cause the input piston to abut on the auxiliary piston. In this condition, therefore, the input and auxiliary pistons are placed in the second state in which the valve device permits the bidirectional fluid flows between the first and second chambers.

When the pressurized brake fluid of the external hydraulic power source is introduced into the second chamber through the control valve which is operated in response to the operation of the brake operating mechanism, the power pressure is produced in the second chamber, and this power pressure is supplied to the first chamber through the communication passage and the valve device, whereby the fluid pressure in the first chamber is applied to the brake cylinder or cylinders of the second braking arrangement. The fluid pressure in the first chamber advances the presser piston, thereby producing the fluid pressure in the pressure chamber, and this fluid pressure is supplied to the brake cylinder or cylinders of the first braking arrangement. At this time, the auxiliary piston is advanced by means of the connecting mechanism, by a distance equal to a distance of advancement of the presser piston. Accordingly, a further amount of operation of the brake operating mechanism and a consequent further advancement of the input piston will not cause the input piston to abut on the auxiliary piston. Therefore, the valve device remains open to permit the bidirectional fluid flows between the first and second chambers.

When the brake operating mechanism is restored to its original inoperative position, the input piston is retracted, and the power pressure in the second chamber is lowered by the switching action of the control valve. Since the first and second chambers are held in communication with each other through the valve device, the fluid pressure in the first chamber is also lowered, whereby the presser piston is retracted, and the fluid pressure in the pressure chamber is accordingly lowered. With the retracting movement of the presser piston, the auxiliary piston is also retracted by the same distance, by means of the connecting mechanism.

While the above description refers to the operation of the instant braking system while the external hydraulic power source and the related components are normally functioning, there will next be described an operation of the system where no power pressure can be obtained due to a failure or trouble of the external hydraulic power source and/or related components. In this event, the fluid pressures in the first and second chambers will not be raised even if a slight amount of operation of the brake operating mechanism places the control valve in its position in which the brake fluid of the external hydraulic power source can be introduced into the second chamber. Therefore, both of the pressure and auxiliary pistons remain at the retracted positions. In this condition, the input piston will abut on the auxiliary piston when the advancing distance of the input piston by an additional amount of operation of the brake operating mechanism reaches the predetermined value. A further advancement of the input piston will cause the input piston and the auxiliary piston to be advanced as a unit. Namely, the input and auxiliary pistons are placed in the above-identified first state, in which the valve device permits a flow of the fluid in the direction from the second chamber to the first chamber, but inhibits a fluid flow in the opposite direction. As a result, the auxiliary piston functions as a piston for pressurizing the fluid in the first chamber, and the operating force which acts on the brake operating mechanism is mechanically transmitted to the auxiliary piston through the input piston. That is, the auxiliary piston is moved toward the presser piston, whereby the brake fluid in the first chamber is pressurized. Concurrently, the pressurized brake fluid in the first chamber advances the presser piston, to thereby pressurize the brake fluid in the pressure chamber. In the manner described above, the fluid pressures in the brake cylinders of the first and second braking arrangements are raised.

Even where the external hydraulic power source and related components are normally functioning or intact, the input and auxiliary pistons may be advanced as a unit in abutting contact with each other, if the brake operating mechanism is abruptly operated, or if the fluid pressure in the second chamber reaches the predetermined upper limit of the external hydraulic power source. In this event, the input and auxiliary pistons are placed in the above-indicated first state, in which the valve device permits the fluid to flow from the second chamber to the first chamber. With the presser piston being advanced by the fluid pressure in the first chamber, the auxiliary piston is also advanced relative to the input piston, whereby the auxiliary and input pistons are moved away from each other. As a result, the input and auxiliary pistons are restored to the above-indicated second state, in which the valve device permits the bidirectional fluid flows between the first and second chambers.

It will be understood from the foregoing description that the braking system according to the present invention assures that the brake cylinders of both the first braking arrangement and the second braking arrangement can be operated by a manual operation of the brake operating mechanism by the vehicle driver, even in the event that no power pressure can be obtained due to a failure or trouble of the external hydraulic power source and related components. Thus, the instant braking system is adapted to minimize the reduction in the overall braking capacity for the vehicle as a whole, in the event of such a hydraulic trouble.

Further, since the brake application to the vehicle can be effected by the brakes of the first and second braking arrangements in the event of the trouble indicated above, the required braking force produced by the brake cylinder or cylinders of each braking arrangement can be comparatively small, whereby the brakes can use friction members which have a relatively low coefficient of friction. Accordingly, it becomes easier to deal with the squealing noises and vibrations of the brakes. In other words, the instant braking system suffers from reduced noises and vibrations of the brakes during a normal operation of the system while the external hydraulic power source and related components are normally functioning.

Moreover, the valve device permits the brake fluid to flow from the second chamber to the first chamber, even if the input and auxiliary pistons are advanced as a unit in abutting contact with each other, as a result of an abrupt operation of the brake operating mechanism. In this instance, if the bidirectional fluid flows between the first and second chambers were completely inhibited, the brake cylinder or cylinders of the second braking arrangement is/are supplied with only the brake fluid which is forced out of the first chamber due to the advancing movement of the auxiliary piston. Namely, the volume of the first chamber is decreased, and the brake operating mechanism should be further operated, to compensate for a decrease in the volume of the first chamber. Hence, the required operating stroke of the brake operating mechanism is undesirably increased, as compared with that in the above-indicated second state wherein the brake fluid is delivered from the external hydraulic power source (second chamber) to the brake cylinder or cylinders of the second braking arrangement. According to the present invention, however, as long as the external hydraulic power source is normally functioning, the brake fluid from the external hydraulic power source is continuously supplied to the brake cylinder or cylinders of the second braking arrangement, even after the input and auxiliary pistons are placed in the above-indicated first state. Thus, the instant braking system does not suffer from an otherwise possible increase in the required operating stroke of the brake operating mechanism, and a resulting time delay before the braking effect is obtained.

The valve device may be constructed so as to include: (a) a valve seat provided in the communication passage, so as to face rearwardly of the auxiliary piston; (b) a shut-off valve having a valving member provided on the input piston such that the valving member faces the valve seat, the shut-off valve having a closed position in which the communication passage is closed by the valving member seated on the valve seat, and an open position in which the communication passage is open with the valving member spaced apart from the valve seat; and (c) check means disposed in parallel to the shut-off valve, and permitting a flow of the brake fluid in a first direction from the second chamber to the first chamber while inhibiting a flow of the brake fluid in a second direction opposite to the first direction. In this case, the check means may include a cup seal disposed on the auxiliary piston such that the cup seal is in contact with an inner surface which defines a cylinder bore formed in the housing. Alternatively, the check means may be a check valve.

The valve device may be constructed so as to include a check valve which includes a valve seat disposed in the communication passage so as to face frontwardly of the auxiliary piston, a valving member biased in a direction toward the valve seat, and a valve control mechanism which prevents the valving member from being seated on the valve seat while the presser piston and the auxiliary piston are spaced apart from each other by the predetermined maximum distance. The valve control mechanism permits the valving member to be seated on the valve seat when the presser and auxiliary pistons approach each other by more than a predetermined distance. The check valve with the thus constructed valve control mechanism inhibits a flow of the brake fluid from the first chamber to the second chamber while permitting a flow of the brake fluid from the second chamber to the first chamber when the auxiliary and input pistons are placed in the first state. The check valve provides fluid communication between the first and second chambers when the auxiliary and input pistons are placed in the second state.

The control valve may be adapted to operate based on a relative movement between the input and auxiliary pistons. That is, the auxiliary piston is moved together with the presser piston, due to the mechanical connection therebetween by the connecting mechanism, unless an operating force is mechanically exerted from the input piston to the auxiliary piston. Therefore, if the control valve is operated based on a relative movement between the input and auxiliary pistons, the control valve is operated based on a relative movement between the input and presser pistons.

For minimizing the required operating force of the brake operating mechanism, it is desirable that the area of the pressure receiving surface of the auxiliary piston with respect to the first chamber be smaller than that of the presser piston with respect to the first chamber.

The connecting mechanism may be adapted to include: a first engaging portion provided on one of the presser piston and the auxiliary piston; a second engaging portion provided on the other of the presser and auxiliary pistons, and engaging the first engaging portion such that the first and second engaging portions permit an axial relative movement between the presser and auxiliary pistons over predetermined distance, and inhibits the axial relative movement exceeding the predetermined distance; and a spring interposed between the presser and auxiliary pistons, for biasing the presser and auxiliary pistons in opposite directions away from each other.

In one form of the above arrangement of the connecting mechanism, the first engaging portion consists of a bolt which has a shaft portion, an externally threaded portion formed at one end of the shaft portion, and a head portion formed at the other end of the shaft portion, and the second engaging portion consists of a hollow connecting member having a through hole which permits passage of the shaft portion of the bolt and which prevents passage of the head portion. The externally threaded portion of the first engaging portion is threaded to one of the presser piston and the auxiliary piston while the shaft portion is inserted in the through hole. The hollow connecting member is fixed to the other of the presser and auxiliary pistons.

In an alternative form of the same arrangement of the connecting mechanism, the first engaging portion consists of a first protrusion having a first shaft portion which extends from one of the presser and auxiliary pistons coaxially with the one piston, and a first flange portion which extends from the first shaft portion in a radially outward direction, and the second engaging portion includes: a second protrusion having a second shaft portion which extends from the other of the presser and auxiliary pistons coaxially with the other piston, and a second flange portion which extends from the second shaft portion in a radially outward direction; a pair of semi-cylindrical members butted together into a split cylinder which has two inward flanges that are spaced apart from each other in an axial direction thereof; and an outer sleeve fitted on an outer circumferential surface of the split cylinder such that the first and second flange portions of the first and second protrusions are positioned within the split cylinder and such that the inward flanges prevent disengagement of the first and second flange portions from the split cylinder, the outer sleeve preventing the pair of semi-cylindrical members of the split cylinder from being separated from each other. At least one of the first and second shaft portions of the first and second protrusions has a length which permits a relative movement between the at least one of the first and second shaft portions and the split cylinder, in an axial direction of the split cylinder. In this case, the outer sleeve may be adapted to bear or support one end of the spring, thereby serving as a retainer for the spring.

The auxiliary piston may have a cylindrical portion axially extending from an end face thereof on the side of the second chamber. The cylindrical portion is fitted in the housing while the input piston is fitted in the cylindrical portion. In this case, the auxiliary piston may function as a guide for slidably supporting the input piston, and therefore eliminates an otherwise required guide portion formed on the housing, thus making it possible to reduce the overall length of the hydraulic booster.

The auxiliary piston and the input piston may be fitted directly in the housing. In this instance, the fluid pressure within the housing does not act on the auxiliary piston in the rearward direction, whereby the required strength of the connecting mechanism for connecting the auxiliary and presser pistons can be reduced. Further, the instant arrangement prevents an increase in the sliding resistance of the auxiliary and presser pistons which arises from a radial deviation of the acting point of the pull force between the two pistons, from their axis, due to manufacturing errors of the connecting mechanism.

BRIEF DESCRIPTION OF THE DRAWINGS

The foregoing and optional objects, features and advantages of the present invention will be better understood by reading the following detailed description of presently preferred embodiments of the invention, when considered in connection with the accompanying drawings, in which.

DETAILED DESCRIPTION OF THE PREFERRED EMBODIMENTS

The presently preferred embodiments of the hydraulically operated braking system of this invention, as applied to a four-wheel drive motor vehicle, will be described in detail by reference to the accompanying drawings.

Figure 1:
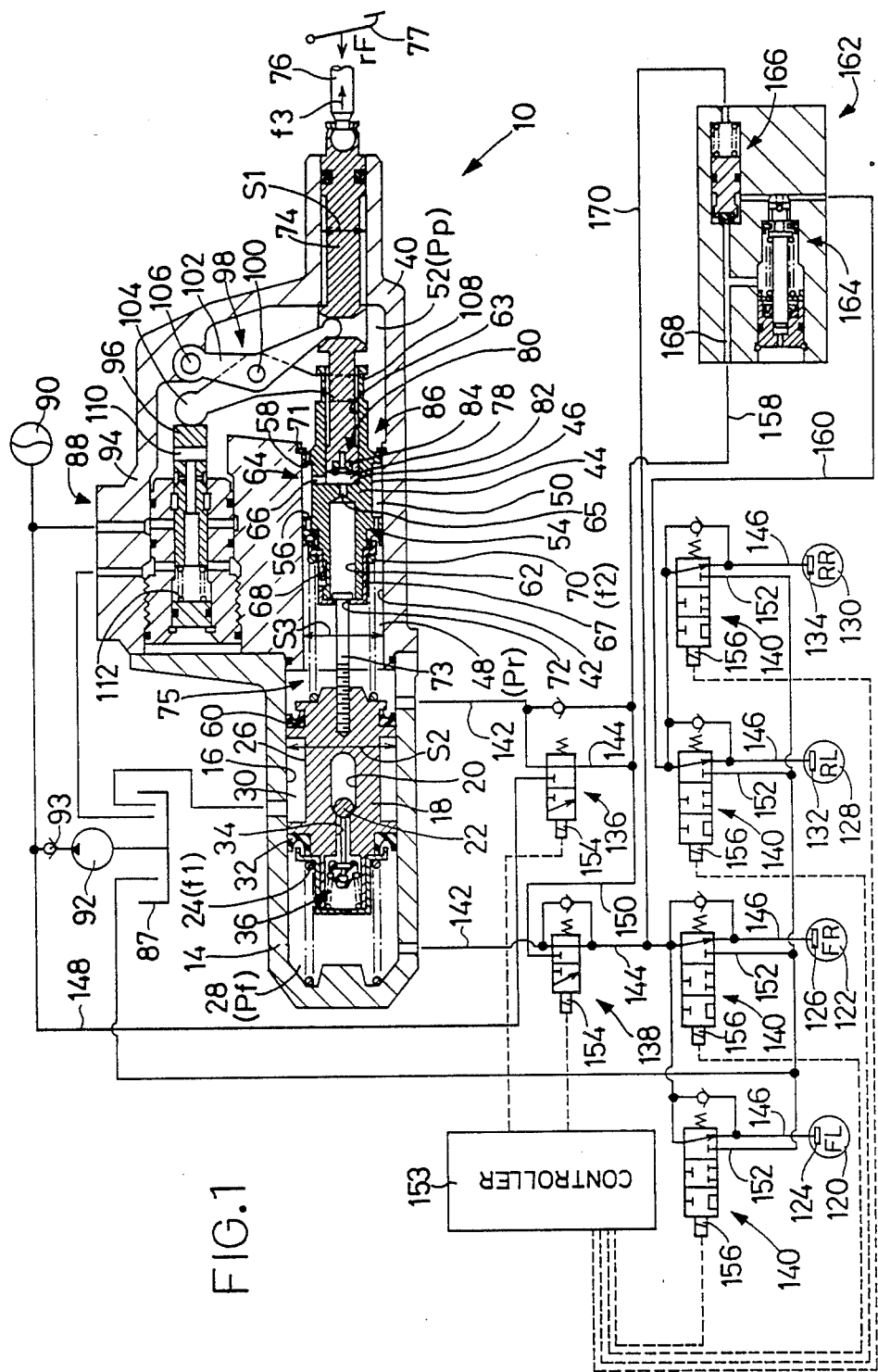
FIG. 1 is a schematic view of one embodiment of a hydraulically operated braking system of the present invention, which view includes a front elevational view in cross section of a master cylinder connected to a hydraulic booster.

Referring first to FIG. 1, reference numeral 10 generally denotes a master brake cylinder equipped with a hydraulic booster (hereinafter simply referred to as "master cylinder"). This master cylinder 10 is provided with first housing 14 having a generally cylindrical configuration which is closed at one end thereof. The first housing 14 has a cylinder bore 16 in which a presser piston 18 is slidably fitted. The presser piston 18 has a through hole 20 formed through its axially middle portion in a direction perpendicular to its axis. The first housing 14 has a pin 22 secured thereto, such that the pin 22 extends through the through hole 20. While the presser piston 18 is biased in a rearward direction by a first return spring 24, a rearmost position of the piston 18 is determined by an abutting contact of the circumference of the pin 22 against an inner surface of the piston 18 which defines a front end of the through hole 20. The presser piston 18 further has an annular groove 26 formed in the circumferential surface of the above-indicated middle portion. The first housing 14 and the presser piston 18 cooperate with each other to define a pressure chamber 28 in front of the piston 18, and a constant-volume chamber 30 which corresponds to the annular groove 26. At a portion of the presser piston 18 which separates the pressure chamber 28 and the constant-volume chamber 30 from each other, there is provided a cup seal 32 which functions to prevent a flow of a brake fluid in a direction from the pressure chamber 28 toward the constant-volume chamber 30.

Further, the presser piston 18 is formed with a communication hole 34 which communicates with the through hole 20 and the pressure chamber 28. A shut-off valve 36 is provided at one of opposite open ends of the communication hole 34 on the side of the pressure chamber 28. While the presser piston 18 is placed in its retracted position, this shut-off valve 36 is held open by the pin described above, whereby the shut-off valve 36 maintains fluid communication between the pressure and constant-volume chambers 28, 30, allowing the brake fluid to flow from the pressure chamber 28 into the constant-volume chamber 30. With the presser piston 18 advanced by a predetermined short distance, the shut-off valve 36 is closed and inhibits a flow of the brake fluid into the constant-volume chamber 30.

To the rear end of the first housing 14 is fluid-tightly fixed a second housing 40 having a cylinder bore 42 in which is slidably fitted an auxiliary piston 44 such that the pressure and auxiliary pistons 18, 44 are coaxial with each other. The auxiliary piston 44 has an annular groove 46 formed in an axially middle portion thereof. The auxiliary piston 44 fitted in the cylinder bore 42 and the presser piston 18 cooperate to define a first power chamber 48 therebetween, and the second housing 40 cooperates with the auxiliary piston 44 to define a constant-volume chamber 50 corresponding to the annular groove 46. Further, a second power chamber 52 is formed behind the auxiliary piston 44. At a portion of the auxiliary piston 44 which separates the first power chamber 48 and the constant-volume chamber 50, there is provided a cup seal 54 which functions so as to allow a flow of the brake fluid in a direction from the constant-volume chamber 50 to the first power chamber 48 through a first communication hole 56, but inhibit a flow of the brake fluid in the reverse direction. The constant-volume chamber 50 is held in communication with the second power chamber 52, through a second communication hole 58. A cup seal 60 is provided at a portion of the presser piston 18 which separates the constant-volume chamber 30 and the first power chamber 48, in order to prevent a flow of the brake fluid from the first power chamber 48 to the constant-volume chamber 30.

The auxiliary piston 44 has a first blind hole 62 and a second blind hole 63 which are formed concentrically with its axis, so as to extend from its front and rear end faces, respectively, toward its intermediate portion. These first and second blind holes 62, 63 communicate with each other via an axial communication hole 65, while the second blind hole 63 communicates with the constant-volume chamber 50 via a radial communication hole 66. Thus, in the present embodiment, a communication passage 64 (hereinafter referred to as "auxiliary piston communication passage") for fluid communication between the first and second power chambers 48, 52 is formed by the constant-volume chamber 50, first and second communication holes 56, 58, first and second blind holes 62, 63, and axial and radial communication holes 65, 66.

Between the rear end of the pressure piston 18 and the front end of the auxiliary piston 44, there is disposed a second return spring 70 via a hollow connecting member 67, such that the second return spring 70 biases the presser and auxiliary pistons 18, 44 in opposite directions away from each other. A rearward movement of the auxiliary piston 44 by the second return spring 70 is limited by a stop 71.

The front end face of the hollow connecting member 67 has a through hole 72 formed in its central part. A connecting bolt 73 is threaded at its front externally threaded portion to the rear portion of the presser piston 18. The shaft portion of the bolt 73 extends through the through hole 72 into the first blind hole 62 formed in the auxiliary piston 44. The connecting bolt 73 has a head portion at its rear end. The head portion has a larger diameter than the through hole 72 and which is positioned within the first blind hole 62, whereby the connecting bolt 73 is prevented from being disengaged frontwardly from the hollow connecting member 67. Since the hollow connecting member 67 has a detent portion 68 for preventing itself from being disengaged frontwardly from the auxiliary piston 44, the connecting bolt 73 determines a maximum spacing distance between the presser and auxiliary pistons 18, 44. There is provided a slight axial clearance between the hollow connecting member 67 and the head of the connecting bolt 73, while the presser and auxiliary pistons 18, 44 are both placed in heir retracted positions. Thus, the retracted positions o the pistons 18, 44 can be precisely established. In the present embodiment, the connecting bolt 73, hollow connecting member 67 and second return spring 70 constitute a connecting mechanism 75 (hereinafter referred to as "piston connecting mechanism") for connecting the presser and auxiliary pistons 18, 44.

In the second housing 40, there is also slidably and fluid-tightly received an input piston 74 such that the input piston 74 is coaxial with the auxiliary piston 44 and extends through the rear end of the housing 40, with its rear end portion exposed to the atmosphere. The front end portion of the input piston 74 is slidably fitted in the second blind hole 63 of the auxiliary piston 44. To the input piston 74 is connected by caulking an input rod 76 which is operatively connected by a suitable link mechanism (not shown) to a brake pedal 77. The input rod 76 is biased by a third return spring (not shown) toward its retracted position. Accordingly, the input piston 74 is also biased toward its retracted position. The input piston 74 is formed at an axially middle portion thereof with a large-diameter portion received within the second housing 40. This large-diameter portion is adapted to abut at its rear face on an inner wall surface of the second housing 40, and thereby determine the retracted position of the input piston 74. In the present embodiment, therefore, the input rod 76, link mechanism, third return spring and brake pedal 77 constitute a brake operating mechanism.

While the auxiliary and input pistons 44, 74 are both placed in their retracted positions, there exists a predetermined axial clearance between the front end face of the input piston 74 and the rear open end of the second blind hole 63 in the auxiliary piston 44. A shut-off valve 80 is disposed within a space 78 which corresponds to the axial clearance indicated above. This shut off valve 80 has a valve seat 82 formed around the open end of the second blind hole 63 so as to face rearwardly, and a valving member 84 which is made of a rubber material and which is attached to the front end face of the input piston 74 so as to face the valve seat 82. While the input piston 74 is held in abutting contact with the auxiliary piston 44, the shut-off valve 80 is closed and inhibits fluid communication between the axial communication hole 65 and the second blind hole 63. While the pistons 74, 44 are spaced apart from each other, the shut-off valve 80 is held open permitting fluid communication between the axial communication and second blind holes 65, 63. In the present embodiment, therefore, a valve device 86 is constituted by the shut-off valve 80, and the cup seal 54 which functions as check valve means as described above.

While the constant-volume chamber 30 is held in communication with a reservoir 87, the second power chamber 52 is controlled by a control valve 88, so as to be selectively placed in one of three states: a state in which the chamber 52 communicates with an accumulator 90; a state in which the chamber 52 communicates the reservoir 87; and a state in which the chamber 52 is disconnected from both of the reservoir and accumulator 87, 90. The accumulator 90 is adapted to store a brake fluid under a pressure within a predetermined range, which fluid is pumped up from the reservoir 87 by a pump 92. On the delivery side of the pump 92, there is provided a check valve 93 which permits the pressurized brake fluid to flow only in a direction from the reservoir 87 toward the accumulator 90. Namely, the check valve 93 prevents a flow of the brake fluid back into the reservoir 87. The check valve 93 is designed so as to be opened at a considerably low pressure.

The control valve 88 is equipped with a valve spool 96 which is supported by a valve housing 94 formed integrally with the second housing 40, such that the valve spool 96 is movable parallel to a direction of movement of the auxiliary piston 44. This valve spool 96 engages the auxiliary and input pistons 44, 74, via a motion converting mechanism 98. The motion converting mechanism 98 includes a first link 102 and a second link 104 which are mutually pivotally connected by a pin 100 to each other at intermediate portions thereof. The first link 102 is pivotally supported at its one end by a support shaft 106 secured to the second housing 40, while the other end of the link 102 pivotally engages the input piston 74. On the other hand, one end of the second link 104 pivotally engages an annular groove 108 which is formed on the outer circumference of the auxiliary piston 44, while the other end is held in abutting contact with the rear end face of the valve spool 96. According to this arrangement, the valve spool 96 is advanced as the input piston 74 is advanced while the auxiliary piston 44 is held stationary.

The valve spool 96 has a communication hole 110 formed therethrough. The valve spool 96 is normally placed in its original position as shown in FIG. 1, under a biasing action of a spring 112 which acts on the spool 96 in the rearward direction. In the original position, the communication hole 110 maintains fluid communication between the second power chamber 52 and the reservoir 87. When the valve spool 96 is moved a predetermined distance in the forward direction (in the left direction as seen in FIG. 1), the second power chamber 52 is disconnected from both of the reservoir 87 and the accumulator 90. With a further advancing movement of the valve spool 96, the second power chamber 52 is brought into communication with the accumulator 90.

Brake fluid pressures produced in the pressure chamber 28 and first power chamber 48 are applied to front wheel cylinders 124, 126 of front wheel brakes provided on left and right front wheels 120, 122, and rear wheel cylinders 132, 134 of rear wheel brakes provided on left and right rear wheels 128, 130. In the present embodiment, the front wheel cylinders 124 and 126 serve as brake cylinders of a first or front braking arrangement, while the rear wheel cylinders serve as brake cylinders of a second or rear braking arrangement.

Since the front and rear (first and second) braking arrangements are substantially identical in basic construction with each other, elements of the two arrangements which have similar functions are indicated by the same reference numerals, and the rear braking arrangement will be described by way of example. The front braking arrangement will be described to an extent necessary to supplement the illustrative description of the front braking arrangement.

In a primary fluid passage between the master cylinder 10 and the rear wheel cylinders 132, 134, there are provided a solenoid-operated directional control valve 136 common to the two rear wheel cylinders 132, 134, and two solenoid-operated directional control valves 140 corresponding to the two rear wheel cylinders 132, 134. The solenoid-operated valve of the front braking arrangement, which corresponds to the solenoid-operated valve 136 of the rear braking arrangement, is designated by reference numeral 138, so that the two valves 136, 138 are distinguished from each other, for easy understanding. By the solenoid-operated valves 136 and 140, the primary fluid passage is divided into a master cylinder passage 142, an intermediate passage 144, and two wheel cylinder passages 146. To the solenoid-operated valve 136 of the rear braking arrangement, there is connected an accumulator passage 148 which is connected to the accumulator 90 described above. The solenoid-operated valve 138 of the front braking arrangement is connected through a fluid passage 150 to the solenoid-operated valve 136 of the rear braking arrangement, and is consequently connected through the valve 136 to the accumulator 90. Each of the four solenoid-operated valves 140 is connected through a reservoir passage 152 to the reservoir 87 described above.

The solenoid-operated directional control valve 136 is operable between a first position in which the valve 136 maintains fluid communication between the master cylinder passage 142 and the intermediate passage 144, and a second position in which the valve 136 maintains fluid communication between the accumulator passage 148 and the intermediate passage 144. In the first position, the brake fluid delivered from the master cylinder 10 into the master cylinder passage 142 is fed to each solenoid-operated directional control valve 140 through the intermediate passage 144. In the second position, the brake fluid delivered from the accumulator 90 into the accumulator passage 148 is fed to each solenoid-operated valve 140 through the intermediate passage 144.

The solenoid-operated directional control valve 138 is operable between a first position in which the valve 138 maintains fluid communication between the master cylinder passage 142 and the intermediate passage 144, and a second position in which the valve 138 maintains fluid communication between the fluid passage 150 and the intermediate passage 144. In the first position, the brake fluid delivered from the master cylinder 10 into the master cylinder passage 142 is fed to each solenoid-operated directional control valve 140 through the intermediate passage 144. In the second position, the brake fluid delivered from the accumulator 90 into the fluid passage 150 via the accumulator passage 148 and solenoid-operated valve 136 is fed to each solenoid-operated valve 140 through the intermediate passage 144.

These solenoid-operated directional control valves 136, 138 are operated under the control of a controller 153. This controller 153 is principally constituted by a microcomputer, and is adapted to estimate a slip condition of the motor vehicle, based on an output signal of speed sensors (not shown) which detects the rotating speeds of the wheels of the vehicle. If a slip ratio of any one of the four wheels exceeds a predetermined upper limit, a solenoid 154 of the appropriate solenoid operated valve 136, 138 is energized to place the valve 136 in its second position (left position as seen in FIG. 1). Since this switching operation is well known in the art and is not essential to the understanding of the present invention, no detailed description is deemed necessary.

Each of the solenoid-operated valves 140 is a directional control valve which is operable selectively in one of three positions, i.e., a pressure increase position, a pressure hold position and a pressure decrease position. In the pressure increase position, the valve 140 maintains fluid communication of the intermediate passage 144 with the corresponding wheel cylinder passsage 146, thereby permitting the fluid pressure in the rear wheel cylinder 132, 134 to rise due to a flow of the brake fluid from the master cylinder 10 or accumulator 90 through the intermediate passage 144. In the pressure hold position, the valve 140 maintains the current fluid pressure in the rear wheel cylinder 132, 134, by disconnecting all of the intermediate passage 144, wheel cylinder passage 146 and reservoir passage 152. In the pressure decrease position, the valve 140 maintains fluid communication of the corresponding wheel cylinder passage 146 with the reservoir passage 152, permitting the brake fluid to be discharged from the corresponding rear wheel cylinder 132, 134 toward the reservoir 87, thereby permitting a decrease of the fluid pressure in the wheel cylinder 132, 134.

These solenoid-operated directional control valves 140 are also controlled by the controller 153. Described more specifically, the controller 153 regulates an electric current to be applied to a solenoid of each valve 140, so as to place the valve 140 in an appropriate one of the above-indicated three positions, according to the detected slip condition of the corresponding vehicle wheel, so that the slip ratio of each of the rear left and right wheels 128, 130 is maintained in an optimum range. For the same reason as described above with respect to the solenoid-operated valves 136, 138, no detailed description of the valves 140 is deemed necessary.

A proportioning/by-pass valve (hereinafter abbreviated as "P/B valve") 162 is provided part way through the intermediate passage 144 of the rear braking arrangement for the rear left and right wheels 128, 130. The P/B valve 162 divides that intermediate passage 144 into a master cylinder side passage 158 and a wheel cylinder side passage 160. The P/B valve 162 is equipped with a proportioning valve (hereinafter abbreviated as "P valve") 164 and a by-pass valve (hereinafter abbreviated as "B valve") 166. These P and B valves 164, 166 are connected in parallel to each other by a connecting passage 168.

The P valve 164 is held open as long as the fluid perssure in the master cylinder side intermediate passage 158 is below a predetermined level. When the pressure in the passage 158 rises above that predetermined level, the P valve 164 starts to operate for reducing the pressure in the passage 158. Stated more particularly, the fluid pressure supplied from the master cylinder 10 to the master cylinder side intermediate passage 158 through the solenoid-operated valve 136 is applied to the rear wheel cylinders 132, 134, without any pressure regulation, while the P valve 164 is held open. During a pressure reducing operation of the P valve 164, the fluid pressure in the passage 158 is lowered at a predetermined ratio, so that the thus lowered pressure is imparted to the wheel cylinder side intermediate passage 160.

The B valve 166 is opened and closed in response to a pressure differential between a braking pressure (hereinafter referred to as "front wheel braking pressure") which is received through a fluid passage 170 from the intermediate passage 144 of the front braking arrangement, and a braking pressure which is received from the solenoid valve 136 through the master cylinder side intermediate passage 158. While the fluid pressure is normally applied to the front wheel cylinders 124, 126, the B valve 166 is held closed. In the event of a pressure failure in the front braking arrangement, the B valve 166 is opened, whereby the fluid pressure supplied from the solenoid-operated valve 136 to the master cylinder side intermediate passage 158 is directly applied to the wheel cylinder side intermediate passage 160, without a pressure regulation by the P valve 164. Accordingly, the B valve 166 functions to avoid an otherwise undesirable condition in which the fluid pressure in the rear wheel cylinders 132, 134 is unnecessarily lowered by the P valve 164, in the event of a pressure failure of the front braking arrangement.

An operation of the instant braking system will then be described. It is noted that the following operational description refers only to a case where the slip ratio of the wheels is not excessive, and where the solenoid-operated directional control valve 136, 138 is placed in the first position for fluid communication between the master cylinder passage 142 and the intermediate passage 144, while the solenoid-operated directional control valve 140 is placed in the pressure increase position for fluid communication between the wheel cylinder passage 146 and the intermediate passage 144.

While the brake pedal 77 is not operated, the auxiliary piston 44 and the valve spool 96 are both placed in the retracted positions. In this condition, the second power chamber 52 is disconnected from the accumulator 90 and is held in communication with the reservoir 87. In other words, the application of a relatively high fluid pressure from the accumulator 90 to the second power chamber 52 is blocked by the control valve 88.

When the brake pedal 77 is slightly depressed in the above-indicated condition, the input piston 74 and the input rod 76 (hereinafter simply referred to as the input piston 74) are advanced as a unit, but the auxiliary piston 44 is still held stationary at its retracted position. As a result, the input piston 74 is advanced relative to the auxiliary piston 44. This relative movement is imparted through the motion converting mechanism 98 to the valve spool 96 of the control valve 88. The second power chamber 52 is brought into communication with the accumulator 90 through the communication hole 110 formed in the valve spool 96, whereby the pressurized brake fluid in the accumulator 90 is supplied to the second power chamber 52, and to the first power chamber 48 through the second communication hole 58, constant-volume chamber 50, first communication hole 56 and cup seal 54.

Since the auxiliary and input piston 44, 74 are spaced apart from each other, the shut-off valve 80 for selective communication between the second and first power chambers 52, 48 is held in its open position. Consequently, the brake fluid is supplied from the second power chamber 52 to the first power chamber 48, through the second communication hole 58, constant-volume chamber 50, radial communication hole 66, second blind hole 63, axial communication hole 65 and first blind hole 62. As a result, the fluid pressure in the first power chamber 48 is raised, and the presser piston 18 is advanced, whereby the fluid pressure in the presser chamber 28 is raised while the auxiliary piston 44 and the presser piston 18 are advanced as a unit, by means of the piston connecting mechanism 75. Therefore, a further depression of the brake pedal 77 and a resulting further advancement of the input piston 74 will cause an advancing movement of the auxiliary piston 44, whereby the auxiliary and input pistons 44, 74 are maintained in a state in which the shut-off valve 80 is open.

If the brake pedal 77 is kept depressed by a certain constant amount, the input piston 74 is stopped, and the auxiliary piston 44 is advanced by a small distance relative to the input piston 74. Accordingly, the control valve 88 is placed in a state in which the second power chamber 52 is disconnected from both of the reservoir 87 and the accumulator 90. Thus, the fluid pressure Pr in the first power chamber 48 and the fluid pressure Pf in the pressure chamber 28 are maintained at a constant level.

In this condition, the input piston 74 has a force balance expressed by the following equation (1-1):

$$rF = Pp \cdot S1 + f3 \ldots \qquad (1\text{-}1)$$

where,
F: Operating force acting on brake pedal 77
r: Boosting ratio of brake pedal 77
Pp: Fluid pressure in second power chamber 52
S1: Pressure receiving surface area of input piston 74 (equal to an area of a circle having a diameter equal to an inside diameter of a bore formed through the end portion of second housing 40)
f3: Biasing force of third return spring for input piston 74

Therefore, the fluid pressure Pp in the second power chamber 52 is expressed by the following equation (1-2):

$$Pp = rF/S1 - f3/S1 \ldots \qquad (1\text{-}2)$$

The auxiliary piston 44 has a force balance expressed by the following equation (1-3):

$$R1 = f2 \ldots \qquad (1\text{-}3)$$

where,

R1: Reaction force of presser piston 18 acting on auxiliary piston 44, via connecting pin 73 f2: Biasing force of second return spring 70

Figure 5:
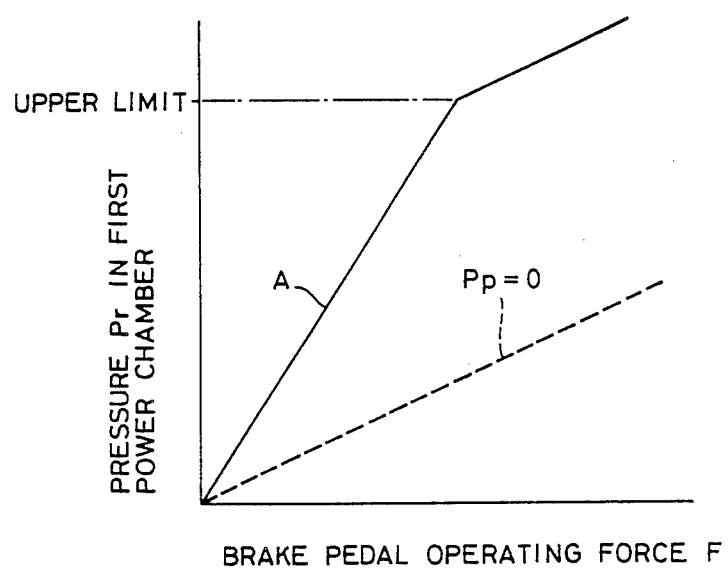
FIG. 5 is a graph showing a relationship between an operating force acting on a brake pedal connected to the master cylinder of the embodiments of FIGS. 1-4, and a hydraulic pressure in a first power chamber of the master cylinder.

Since the fluid pressure Pr in the first power chamber 48 is equal to the fluid pressure Pp in the second power chamber 52, the fluid pressure Pr is expressed by the following equation (1-4), which is indicated at A in the graph of FIG. 5:

$$Pr = rF/S1 - f3/S1 \ldots \qquad (1\text{-}4)$$

The presser piston 18 has a force balance expressed by the following equation (1-5):

$$Pr \cdot S2 + f2 = Pf \cdot S2 + R1 + f1 \ldots \qquad (1\text{-}5)$$

where,

S2: Pressure receiving surface area of presser piston 18 (equal to an area of a circle having a diamter equal to the inside diameter of cylinder bore 16 in first housing 14)

f1: Biasing force of first return spring 24

Accordingly, the fluid pressure Pf in the pressure chamber 28 is expressed by the following equation (1-6):

$$Pf = rF/S1 - f3/S1 - f1/S2 \ldots \qquad (1\text{-}6):$$

When the depressed brake pedal 77 is restored to its original non-operated position, the input piston 74 is retracted, and the control valve 88 is switched to the state for fluid communication of the second power chamber 52 with the reservoir 87. As a result, the fluid pressure Pr in the first power chamber 48 is lowered, and the presser piston 18 is retracted with a result of lowering the fluid pressure Pf in the pressure chamber 28. In the meantime, the auxiliary piston 44 is retracted by the piston connecting mechanism 75, in response to a retracting movement of the presser piston 18.

While the foregoing description refers to the operation of the master cylinder 10 when the external hydraulic power source including the accumulator 90 and the pump 92 is normally functioning or intact, the master cylinder 10 can normally function even in the event of a failure of the external hydraulic power source, as described below.

Suppose a slight amount of depression of the brake pedal 77 and a consequent advancing movement of the input piston 74 will not cause abutment of the input piston 74 against the auxiliary piston 44, the two pistons 44, 74 are placed in the state in which the control valve 80 is open. Since no fluid pressure is generated in the first power chamber 48 in this condition, the presser piston 18 and the auxiliary piston 44 remain stationary. When the amount of advancing movement of the input piston 74 caused by a further amount of depression of the brake pedal 77 exceeds the previously described axial clearance between the input and auxiliary pistons 74, 44, the front end face of the input piston 74 comes into abutting contact with the rear face of the auxiliary piston 44 in which the second blind hole 63 is open. With a further advancing movement of the input piston 74, the two pistons 44, 74 start to be advanced as a unit. In this condition where the two pistons 44, 74 are held in abutting contact with each other, the two pistons 44, 74 are placed in the state in which the control valve 80 is closed, with the valving member 84 completely seated on the valve seat 82. In consequence, the second power chamber 52 and the first power chamber 48 are disconnected from each other. Since the auxiliary piston 44 is mechanically advanced against the biasing action of the second return spring 70, the fluid pressure Pr in the first chamber 48 is raised, and the presser piston 18 is also advanced by the fluid pressure Pr, whereby the fluid pressure Pf in the pressure chamber 28 is also raised.

When the fluid pressure Pr in the first power chamber 48 and the fluid pressure Pf in the pressure chamber 28 have been stabilized at a certain level, with the brake pedal 77 kept depressed by a given amount, the input piston 74 has a force balance expressed by the following equation (1-7), provided the fluid pressure Pp in the second power chamber 52 is equal to the atmospheric pressure:

$$rF = f3 + R2 \ldots \qquad (1\text{-}7):$$

where,

R2: Mechanical reaction force of auxiliary piston 44, which acts on input piston 74

Further, the auxiliary piston 44 has force balance expressed by the following equation (1-8):

$$R2 = Pr \cdot S3 + f2 \ldots \qquad (1\text{-}8)$$

where,

S3: Pressure receiving surface area of auxiliary piston 44 (equal to an area of a circle having a diamter equal to the inside diameter of cylinder bore 42 in second housing 40)

Therefore, the fluid pressure Pr in the first power chamber 48 is expressed by the following equation (1-9), which is obtained from the above equations (1-7) and (1-8):

$$Pr = rF/S3 - (f2 + f3)/S3 \ldots \qquad (1\text{-}9)$$

The equation (1-9) is indicated at Pp=0 in the graph of FIG. 5.

The presser piston 18 has a force balance expressed by the following equation (1-10):

$$Pr \cdot S2 + f2 = Pf \cdot S2 + f1 \ldots \qquad (1\text{-}10)$$

Hence, the fluid pressure Pf in the pressure chamber 28 is expressed by the following equation (1-11), which is obtained from the above equations (1-9) and (1-10):

$$Pf = rF/S3 - (f2 + f3)/S3 + (f2 - f1)/S2 \ldots \qquad (1\text{-}11)$$

As described above, the brake fluid masses in the pressure chamber 28 and first power chamber 48 are pressurized. In the present embodiment, the pressure receiving surface area S3 of the auxiliary piston 44 is made smaller than the pressure receiving surface area S2 of the presser piston 18, so that the required operating force F that should act on the brake pedal 77 in the event of a failure of the external hydraulic power source 90, 92 is reduced.

Even where the external hydraulic power source 90, 92 is normally operating, the input piston 74 may abut on the auxiliary piston 44 and be advanced as a unit, if the brake pedal 77 is abruptly depressed, or if the fluid pressure Pp in the second power chamber 52 reaches the predetermined upper limit of the pressure in the external hydraulic power source. In this case, the shut-off valve 80 is closed. However, the brake fluid in the second power chamber 52 is supplied to the first power chamber 48, through the second communication hole 58, constant-volume chamber 50, first communication hole 56 and cup seal 54. Therefore, even with the shut-off valve 80 placed in the closed position, the rear wheel cylinders 132, 134 can be supplied with a required amount of the brake fluid fed from the second power chamber 52. Accordingly, the above arrangement prevents an increase in the required amount of movement of the auxiliary piston 44 or the required operating stroke of the brake pedal 77 which corresponds to an operating force acting on the brake pedal 77.

In this condition, the input piston 74 has a force balance expressed by the following equation (1-12):

$$rF = Pp.S1 + R2 + f3 \ldots \quad (1\text{-}12)$$

Further, the auxiliary piston 44 has a force balance expressed by the following equation (1-13):

$$Pp.S3 + R2 = Pr.S3 + f2 \ldots \quad (1\text{-}13)$$

Therefore, the fluid pressure Pr in the first power chamber 48 is expressed by the following equation (1-14):

$$Pr = Pp.(1 - S1/S3) + rF/S3 - (f2 + f3)/S3 \ldots \quad (1\text{-}14)$$

Since the presser piston 18 has the force balance expressed by the equation (1-10), the fluid pressure Pf in the pressure chamber 28 is expressed by the following equation (1-15):

$$Pf = Pp.(1 - S1/S3) + rF/S3 - (f2 + f3)/S3 + (f2 - f1)/S2 \ldots \quad (1\text{-}15)$$

The graph of FIG. 5 indicates at B a relationship between the fluid pressure Pr in the first power chamber 48 and the brake operating force F, after the pressure Pr exceeds the predetermined upper limit.

Where the above-described situation occurs with the fluid pressure in the power chambers 48, 52 exceeding the upper limit of the pressure of the external hydraulic power source 90, 92, the situation is maintained as long as the brake pedal 77 is held in the depressed position. If the above situation occurs due to an abrupt depression of the brake pedal 77, however, the fluid pressure Pr in the first power chamber 48 is eventually elevated, and the presser piston 18 is advanced, whereby the auxiliary piston 44 is also advanced and is spaced apart from the input piston 74. When the predetermined axial clearance between the open end of the second blind hole 63 of the auxiliary piston 44 and the front end face of the input piston 74 is recovered, the shut-off valve 80 is opened, and subsequently the system is restored to a normal operating condition.

The thus raised fluid pressure Pf in the pressure chamber 28 is applied to the front wheel cylinders 124, 126, while the similarly raised fluid pressure Pr in the first power chamber 48 is applied to the rear wheel cylinders 132, 134, with a suitable degree of reduction by the P valve 164 of the P/B valve 162. In this manner, brakes are applied to the drive wheels 120, 122, 128 and 130.

Three modified forms of a master cylinder that are different from the master cylinder 10 of the first embodiment will be described. Elements of these modifications that are structurally different from the corresponding elements of the first embodiment are designated by different reference numerals. However, the functionally equivalent elements of the master cylinder 10 and the modified master cylinders are given identical names.

Figure 2:
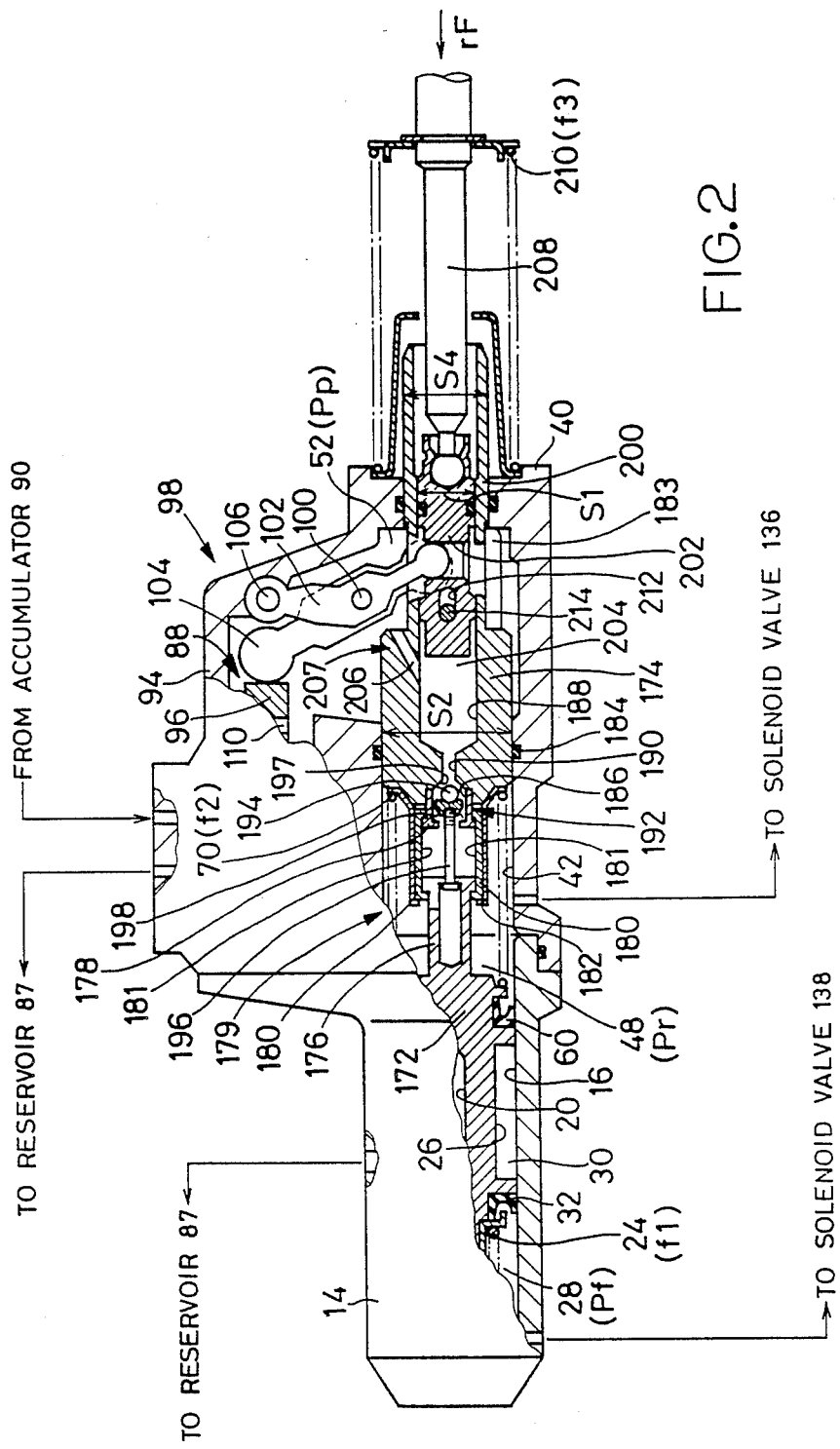
FIG. 2 is a front elevational view partly in cross section of a modified form of a master cylinder with a hydraulic booster, which is different from that of FIG. 1.

Referring to FIG. 2, there is shown a second embodiment of the invention which incorporates the first modified master cylinder. The same reference numerals as used in the first embodiment will be used to identify the components similar to those of the first embodiment. No redundant description of those components will be provided, and the following description refers only to those components characteristic of the instant modified embodiment.

A first protrusion in the form of a first small-diameter portion 176 and a second protrusion in the form of a second small-diameter portion 178 extend coaxially toward each other from a radially central rear end face of a presser piston 172 and from a radially central front end face of an auxiliary piston 174. On the outer circumferential surfaces of these small-diameter portions 176, 178, there are mounted a pair of semi-cylindrical connecting members 180, 180 which are butted together into a split cylinder such that the two members 180 cover the entire circumference of the small-diameter portions 176, 178. The split cylinder 180 has an annular recessed portion 181 formed in their inner circumferential surfaces. The small diameter portions 176, 178 have large-diameter end portions in the form of outwardly extending flange portions which are received within the recessed portion 181, so that the flange portions can abut on respective two axially spaced-apart inward flanges of the split cylinder 180 which are formed at the opposite ends of the annular recessed portion 181. Thus, the outward flange portions of the first and second protrusions or small-diameter portions 176, 178 are prevented from being disengaged from the semi-cylindrical connecting members or split cylinder 180. The split cylinder 180 is fitted in an outer sleeve or cylindrical holder member 182 so that the engagement of the connecting members 180 with the small-diameter portions 176, 178 is maintained. The auxiliary piston 174 is biased by the second return spring 70 (described with respect to the first embodiment) toward its retracted position, which is determined by a stopper projection 183 which is adapted to abut on the second housing 40. In the instant modifiedembodiment, the first and second small-diameter portions 176, 178, connecting members 180 and second return spring 70 constitute a piston connecting mechanism 179 for connecting the presser and auxiliary pistons 172, 174. It is noted that the holder member 182 also serves as a retainer for the second return spring 70.

Fluid tightness between the auxiliary piston 174 and the cylinder bore 42 of the second housing 40 is maintained by a seal 184, which functions to prevent a flow of the brake fluid from the second power chamber 52 toward the first power chamber 48, and a flow of the fluid in the opposite direction.

The auxiliary piston 174 has a first and a second blind hole 186, 188 formed radially central parts of the front and rear end portions thereof. These blind holes 186, 188 communicate with each other through a communication hole 190 which has a small diameter. In the first blind hole 186, there is disposed a check valve 192 provided with a valve control mechanism. This check valve 192 has a valving member 194, and a pin 196 which extends from the valving member 194 toward the presser piston 172. While the presser and auxiliary pistons 172, 174 are spaced apart from each other by a maximum distance permitted by the piston connecting mechanism 179, or while the two pistons 172, 174 are both placed in their retracted positions, the valving member 194 is prevented from being seated on a valve seat 197 which is formed between the first blind hole 186 and the communication hole 190, so as to face the valving member 194. Namely, the check valve 192 is placed in a first position in which the brake fluid may flow in opposite directions between the first blind hole 186 and the communication hole 190. When a spacing distance between the presser and auxiliary pistons 172, 174 is shorter than a predetermined value, the check valve 192 is placed in a second position in which the valving member 194 is seated on the valve seat 194 by the spring 198, whereby the flow of the fluid from the second power chamber 52 to the first power chamber 48 is permitted while the fluid flow in the reverse direction is inhibited. Thus, the check valve 192 with the valve control mechanism serves as a valve device in the present invention.

The auxiliary piston 174 is formed with a small-diameter rear portion 200 which extends fluid tightly and slidably through the end wall of the second housing 40, such that the rear portion 200 is exposed to the atmosphere.

An input piston 202 is fluid tightly and slidably fitted in the second blind hole 188, such that the input piston 202 cooperates with the second blind hole 188 to define a space 204 which is held in communication with the second power chamber 52 through a communication hole 206. Thus, the first and second blind holes 186, 188 and the communication holes 190, 206 constitute a communication passage 207 formed through the auxiliary piston 174.

A rod 208 is secured by caulking to the input piston 202. This rod 208 is biased by a third return spring 210 toward its retracted position. The input piston 202 has an elongate hole 212 through which a pin 214 secured to the auxiliary piston 174 extends, so that the movement of the rod 208 relative to the auxiliary piston 174 is determined by an abutting contact between the circumferential surface of the pin 214 and the front end of the elongate hole 212. Thus, the third return spring 210 also functions as a return spring for the auxiliary piston 174. In the present embodiment, an axial clearance between the front end of the elongate hole 212 of the input piston 202 and the pin 214 of the auxiliary piston 174 corresponds to the axial clearance associated with the shut-off valve 80 of the first embodiment.

Then, an operation of this second embodiment will be described.

When the brake pedal 77 is slightly depressed and the rod 208 is advanced together with the input piston 202, the control valve 88 is opened, whereby the fluid pressure Pp in the second power chamber 52 is raised. In this condition, the rear end of the elongate hole 212 of the input piston 202 remains spaced away from the pin 214 of the auxiliary piston 174, and the two pistons 174, 202 are placed in the state in which the check valve 192 permits fluid flows in the opposite directions between the first and second power chambers 48, 52. Therefore, the brake fluid is supplied from the second power chamber 52 to the first power chamber 48, through the communication hole 206, second blind hole 188, communication hole 190 and first blind hole 186. As in the first embodiment, the fluid pressure Pr in the first power chamber 48 becomes equal to the fluid pressure Pp in the second power chamber 52, and the presser piston 172 is advanced whereby the fluid pressure Pf in the presser chamber 28 is rasied.

With the presser piston 172 advanced, the auxiliary piston 174 is advanced by the same distance, by means of the connecting members 180, 180 and the associated elements. At this time, the presser and auxiliary pistons 172, 174 are advanced with their predetermined maximum spacing distance being maintained. Consequently, the check valve 192 is held in the state wherein the fluid is permitted to flow in the opposite directions between the first and second power chambers 48, 52.

When the fluid pressures Pr, Pf in the first and second power chambers 48, 52 have been stabilized at a given level after the brake pedal 77 is kept depressed for a certain length of time, the input piston 202 and the rod 208 (hereinafter referred to simply as "input piston 202") have a force balance expressed by the equation (1-1) indicated above. In this case, however, "S1" of the equation (1-1) represents a pressure receiving surface area of the input piston 202 (equal to the area of a circle having a diameter equal to the inside diameter of the second blind hole 188 of the auxiliary piston 174), while "f3" of the same equation (1-1) represents a biasing force of the third return spring 210. Hence, the fluid pressure Pp in the second power chamber 52 is expressed by the equation (1-2) indicated above. Further, since the fluid pressure Pp in the second power chamber 52 and the fluid pressure Pr in the first power chamber 48 have been made equal to each other, the fluid pressure Pr is expressed by the equation (1-4) indicated above.

In this condition, the auxiliary piston 174 has a force balance expressed by the following equation (2-1):

$$R3 = Pp \cdot (S2 - S4) + f2 \ldots \quad (2\text{-}1)$$

where,

R3: Reaction force of presser piston 172, which acts on auxiliary piston 174 via connecting members 180, 180

S2: Pressure receiving surface area of auxiliary and presser pistons 174, 172 (equal to the area of a circle having a diameter equal to the inside diameter of cylinder bores 16, 42 of first and second housings 14, 40)

S4: Pressure receiving surface area of small-diameter portion 200 of auxiliary piston 174 (equal to the area of a circle having a diamter equal to the inside diameter of through hole formed through the end wall of second housing 174)

Further, the presser piston 172 has a force balance expressed by the following equation (2-2):

$$Pr \cdot S2 + f2 = Pf \cdot S2 + f1 + R3 \ldots \quad (2\text{-}2)$$

Accordingly, the fluid pressure Pf in the pressure chamber 28 is expressed by the following equation (2-3), which is obtained from the above equations (2-1) and (2-2):

$$Pf = Pp.S4/S2 - f1/S2 \ldots \quad (2\text{-}3)$$

The following description refers to a case where no power pressure is developed in the second power chamber 52 in the event of a failure of the external hydraulic power source.

At the moment when the brake pedal 77 is slightly depressed, the rear end of the elongate hole 212 of the input piston 202 remains spaced away from the pin 214 of the auxiliary piston 174, whereby the two pistons 202, 174 are placed in the state in which the check valve 192 permits the fluid flows in both directions between the first and second power chambers 48, 52. Since neither the second power chamber 52 nor the first power chamber 48 can build up power pressures and the auxiliary and presser pistons 174, 172 are both held stationary, the brake pedal 77 is further depressed, causing the input piston 202 to be advanced by a distance larger than the previously described axial clearance, namely, causing the input piston 202 to abut on the auxiliary piston 174 via the pin 214, whereby the two pistons 174, 202 are advanced as a unit. Consequently, the check valve 192 with the valve control mechanism is placed in the state for permitting the fluid to flow only in the direction from the second power chamber 52 toward the first power chamber 48, when the auxiliary piston 174 comes closer to the presser piston 172 by more than the predetermined distance.

With the brake pedal 77 further depressed with an increased force, the fluid pressure Pr in the first power chamber 48 is raised by an advancing movement of the auxiliary piston 174, while the fluid pressure Pr causes the presser piston 172 to be advanced, resulting in an increase in the fluid pressure Pf in the pressure chamber 28.

With the brake pedal 77 kept depressed, the fluid pressures Pr, Pf in the first power chamber 48 and pressure chamber 28 are stabilized at a certain level. In this condition, the piston 202 has a force balance expressed by the equation (1-7) indicated above. However, "R2" of the equation represents a reaction force of the pin 214 of the auxiliary piston 174, which acts on the input piston 202 via the elongate hole 212. The auxiliary piston 174 has a force balance expressed by the following equation (2-4):

$$R2 = Pr.S2 + f2 \ldots \quad (2\text{-}4)$$

Therefore, the fluid pressure Pr in the first power chamber 48 is expressed by the following equation (2-5):

$$Pr = rF/S2 - (f2 + f3)/S2 \ldots \quad (2\text{-}5)$$

Since the presser piston 18 has a force balance expressed by the above-indicated equation (1-10), that force balance is represented by the following equation (2-6) which is obtained from the above equation (2-5):

$$Pf = rF/S2 - (f1 + f3)/S2 \ldots \quad (2\text{-}6)$$

In the case where the input piston 202 and the auxiliary piston 174 are advanced as a unit in abutting contact with each other, with the external hydraulic power source operating in a normal condition, the two pistons 174, 202 are placed in the state in which the check valve 192 permits the brake fluid to flow only in the direction from the second power chamber 52 toward the first power chamber 48, as in the first embodiment. Thus, the pressurized brake fluid can be delivered from the accumulator 90 to the first power chamber 48.

Figure 3:
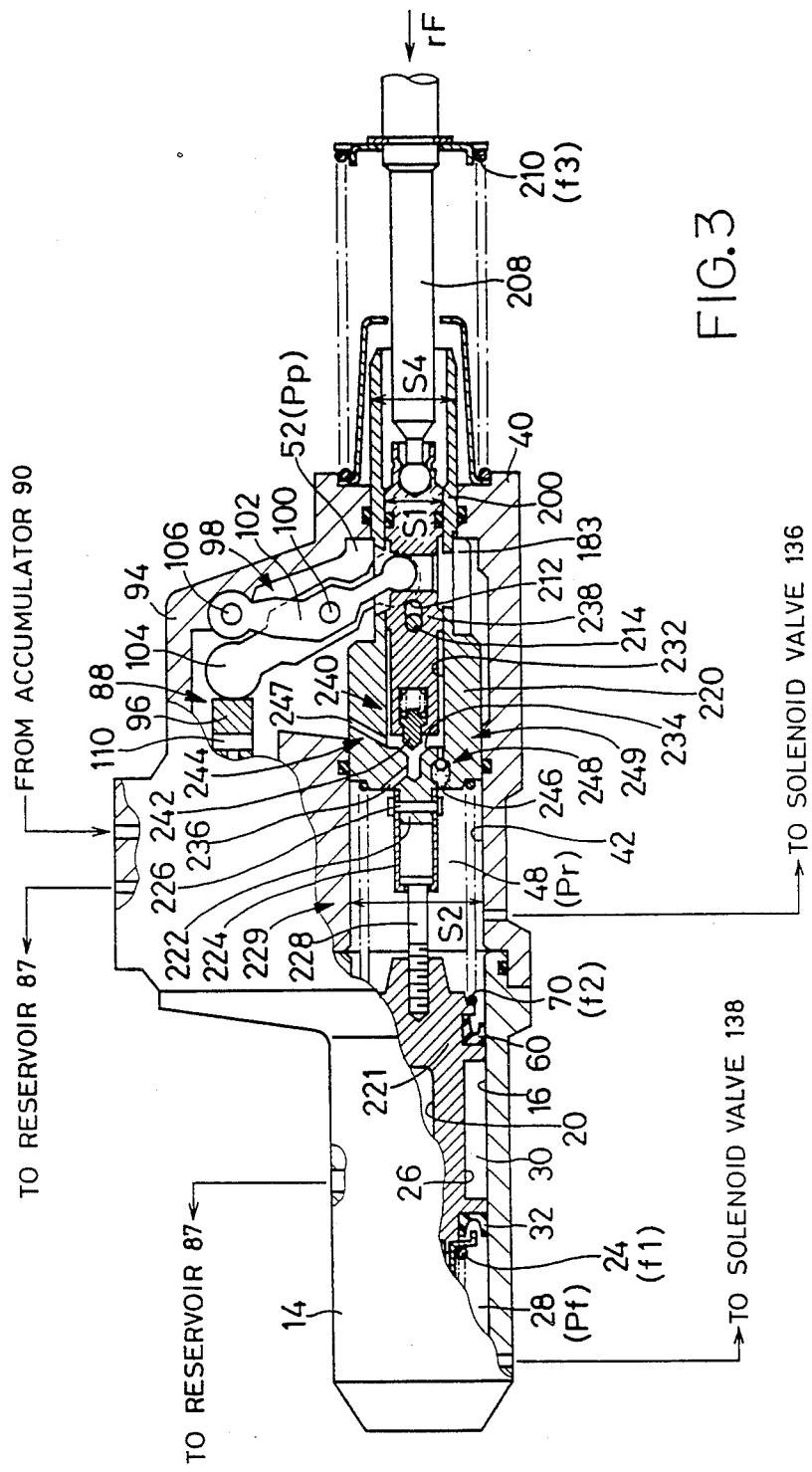
FIG. 3 is a front elevational view partly in cross section of another modified form of a master cylinder with a hydraulic booster.

FIG. 3 illustrates a third embodiment of the present invention, which is different from the second embodiment, in connection with the valve device, piston connecting mechanism, and communicating passage through the auxiliary piston. The same reference numerals as used in the second embodiment will be used to identify the corresponding components. No redundant description of these components will be provided, and only the components characteristics of the present third embodiment will be described in detail.

An auxiliary piston 220 has a small-diameter portion 222 which extends toward a presser piston 221 from a radially central part of its front end face. A cylindrical hollow connecting member 224 is fitted on the outer circumferential surface of the small-diameter portion 222. These small-diameter portion 222 and hollow connecting member 224 are connected to each other by a connecting pin 226. A bolt 228 which extends from a radially central part of the rear end face of the presser piston 221 is inserted in a through hole of the hollow connecting member 224. More specifically, the bolt 228 has an externally threaded front portion threaded in the presser piston 221, a shaft portion which extends through the front open end of the hollow connecting member 224, and a large-diameter head received within the through hole of the hollow connecting member 224, while the front end opening of the through hole has an inside diameter smaller than the outside diameter of the large-diameter head of the bolt 228. Thus, a maximum spacing distance between the presser and auxiliary pistons 221, 220 is determined by the abutting engagement between the hollow connecting member 224 and the bolt 228. That is, the small-diameter portion 222, hollow connecting member 224, connecting pin 226, bolt 228 and second return spring 70 constitute a piston connecting mechanism 229 in the present embodiment.

The auxiliary piston 220 has a small-diameter rear portion 200 which has a blind hole 232 which is open in the rear end face. The bottom surface defining the closed front end of the blind hole 232 has a valve seat 234 which faces in the rearward direction. A first communication passage 236 is formed through a central part of the valve seat 234, such that the passage 236 provides fluid communication between the blind hole 232 and the first power chamber 48. To the front end portion of an input piston 238, there is attached a valving member 242 which cooperates with the valve seat 234 to constitute a shut-off valve 240. When the input and auxiliary pistons 238, 220 are spaced apart from each other by a predetermined distance, the valving member 242 is not seated on the valve seat 234. When the rear end of the elongate hole 212 of the input piston 238 abuts on the pin 214 of the auxiliary piston 220, the valving member 242 is seated on the valve seat 234, whereby the shut-off valve 240 is closed to disconnect the first communication passage 236 from the blind hole 232. The shut-off valve 240 is designed so that the valve 240 remains closed even after the fluid pressure in the blind hole 232 becomes equal to the predetermined upper limit pressure of the accumulator 90.

The auxiliary piston 220 further has a second communication passage 246 for fluid communication between the first power chamber 48 and the blind hole 232, in parallel with the fluid communication through the first communication hole 236. The auxiliary piston 220 further has a third communication passage 247 for fluid communication between the blind hole 232 and the second power chamber 52. In the second communication passage 246, there is provided a check valve 248 which permits a flow of the fluid from the blind hole 232 into the first power chamber 48, but inhibits a flow of the fluid in the reverse direction. The check valve 248 is adapted to be opened at a considerably low pressure. In the present embodiment, the first, second and third communication passages 236, 246, 247 constitute a communication passage 244 of the auxiliary piston 220, and the check valve 248 serving as check means, and the shut-off valve 240 constitute a valve device 249.

An operation of the instant third embodiment will be described.

Upon depression of the brake pedal 77, the shut-off valve 240 is open. Consequently, the fluid pressure in the second power chamber 52 is applied to the first power chamber 48, through the third communication passage 247, blind hole 232 and first communication passage 236 of the auxiliary piston 220, or through the third communication passage 247, blind hole 232, second communication passage 246 and check valve 248. As a result, the fluid pressure Pr in the first power chamber 48 becomes equal to the fluid pressure Pp in the second power chamber 52. As in the second embodiment, the presser piston 221 is then advanced to raise the fluid pressure Pf in the pressure chamber 28.

With an advancing movement of the presser piston 221, the auxiliary piston 220 is advanced by the same distance by means of the hollow member 224 and the related components. Therefore, the spacing distance between the presser and auxiliary pistions 221, 220 remains constant.

Where no pressure can be obtained in the second power chamber 52 due to a failure of the external hydraulic power source, an advancing movement of the input piston 238 as a result of an operation of the brake pedal 77 causes the same piston to abut on the auxiliary piston 220, and then the two pistions 238, 220 start to be advanced as a unit. As a result, the shut-off valve 240 is closed, whereby the fluid pressures Pr and Pf in the first power chamber 48 and pressure chamber 28 are raised, as in the second embodiment.

When the external hydraulic power source is intact, advancing movements of the input and auxiliary pistons 238, 220 in abutting contact with each other will cause the shut-off valve 240 to be closed. In this condition, however, the fluid pressure in the second power chamber 52 is applied to the first power chamber 48, through the third communication passage 247, blind hole 232 and check valve 248.

Figure 4:
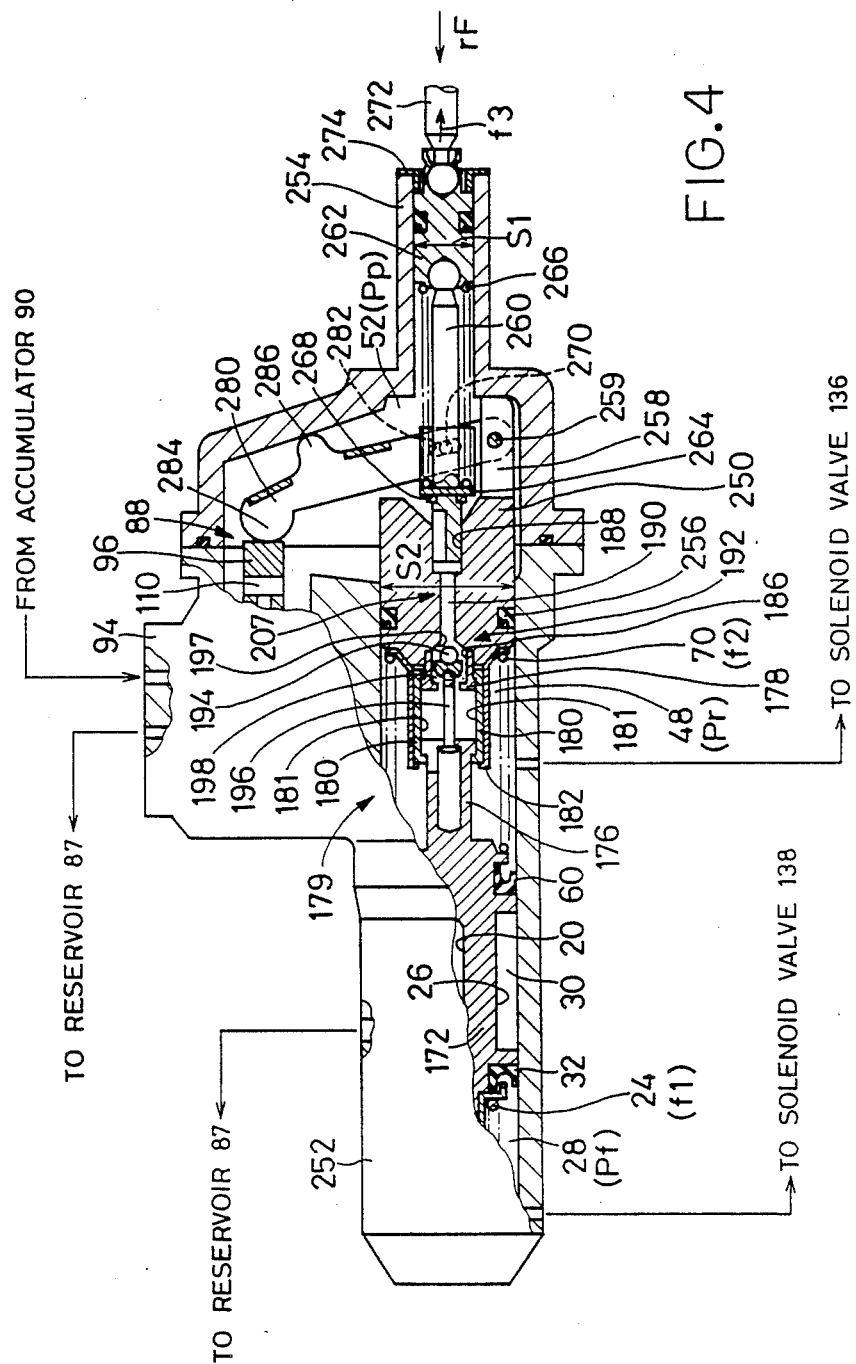
FIG. 4 is another modified form of a master cylinder with a hydraulic booster.

FIG. 4 shows a fourth embodiment of the present invention. The master cylinder of this fourth embodiment is different from that of the second embodiment, particularly in connection with the auxiliary piston, motion converting mechanism and input piston. The same reference numerals as used in the second embodiment will be used to identify the corresponding components, and no redundant description of these components will be provided. Only the components characteristics of the present embodiment will be described in detail.

The housing structure of the instant master cylinder has a cylinder bore in which the presser piston 172 and auxiliary piston 250 are slidably received. The housing structure consists of a first housing 252 having the valve housing 94 as an integral part thereof, and a second housing 254 which is fluid tightly fixed to the rear end of the first housing 252.

Unlike the auxiliary piston 174 of the second embodiment, the auxiliary piston 250 does not have a portion exposed to the atmosphere. The auxiliary piston 250 is fitted in the first housing 252, fluid tightly by means of a cup seal 256 which permits a flow of the fluid from the second power chamber 52 into the first power chamber 48 but inhibits a flow of the fluid in the reverse direction. Stated differently, both the check valve 192 serving as a valve device, and the cup seal 256 always permit a supply of the brake fluid from the second power chamber 52 to the first power chamber 48, in the present embodiment. The auxiliary piston 250 is biased toward its retracted position by the second return spring 70. The retracted position of the piston 250 is determined by a stopper projection 258, which has a first pin 259 extending in a direction perpendicular to the axis of the auxiliary piston 250 (extending perpendicularly to the plane of FIG. 4).

In the second blind hole 188 of the auxiliary piston 250, there is slidably received a front end portion of a first rod 260. In the present embodiment, there is provided a predetermined axial clearance between the end face defining the closed end of the second blind hole 188, and the front end face of the first rod 260. An input piston 262 fluid tightly extends through the rear end portion of the second housing 254, such that its rear end is exposed to the atmosphere. The input piston 262 is caulked at its front end to the rear end of the first rod 260, so that the piston 262 and the rod 260 are moved together.

The first rod 260 has a retainer 264 slidably fitted thereon. A fourth return spring 266 is disposed between the retainer 264 and the input piston 262. An advancing movement of the retainer 264 relative to the first rod 260 is limited by a retaining ring 268. The retainer 264 has a second pin 270 which extends parallel to a first pin 259 of the auxiliary piston 250.

The input piston 262 is caulked at its rear end to a second rod 272, which is connected to the brake pedal 77 by a link mechanism (not shown). The second rod 272 is biased in the rearward direction by the third return spring (not shown) indicated above. Since the second rod 272 and the input piston 262 are moved as a unit, the third return spring functions also as a return spring for biasing the input piston 262 in the rearward direction. The retracted position of the input piston 262 is determined by a stop 274 fixed to the second housing 40. In the present embodiment, the first rod 260 serves as a part of the input piston, and the second rod 272, link mechanism, third return spring and brake pedal 77 constitute a brake operating member 275

Reference numeral 280 designates a link which is substituted for the motion converting mechanism 98 used in the preceding embodiments. This link 280 is supported at its one end by the auxiliary piston 250, pivotally about the first pin 259. The link 280 has an elongate hole 282 formed in a generally intermediate portion thereof. The second pin 270 of the retainer 264 engages the elongate hole 282. The link 280 has an abutting portion 284 formed at the other end remote from the pivotally supported end described above, and a protrusion 286 which protrudes in the rearward direction. Normally, the link 280 is positioned such that the abutting portion 284 is in abutting contact with the rear end face of the valve spool 96, while the protrusion 286 is in abutting contact with the inner surface of the second housing 254. This position of the link 280 determines the retracted position of the valve spool 96. When the first rod 260 is advanced while the auxiliary piston 250 is placed in the retracted position, the valve spool 96 is also advanced. The distance of movement of the valve spool 96 is boosted relative to that of the first rod 260, by a leverage of the link 280.

An operation of the instant fourth embodiment will be described.

With the brake pedal 77 depressed, the second rod 272, input piston 262 and first rod 260 are advanced as a unit against a biasing force of the third return spring. As a result, the control valve 88 is opened, and the fluid pressure Pp in the second power chamber 52 is elevated. The elevated fluid pressure Pp is applied to the first power chamber 48, through the second blind hole 188, communication hole 190 and first blind hole 186 of the auxiliary piston 250, or through a sliding gap between the outer circumferential surface of the auxiliary piston 250 and the inner surface of the second housing 254 defining the cylinder bore, and through the cup seal 256. Consequently, the fluid pressure Pr in the first power chamber 48 becomes equal to the fluid pressure Pp in the second power chamber 52.

While the fluid pressures Pr, Pf in the first power and pressure chambers 48, 28 are maintained at a given level with the brake pedal 77 kept depressed, the second rod 272, input piston 262 and first rod 256 (hereinafter reforrred to as "input piston 262"); auxiliary piston 250; and presser piston 172 have force balances expressed by the above-indicated equations (1-1), (1-3) and (1-5), respectively. In this condition, the auxiliary piston 250 is stopped. "S1" represents the pressure receiving surface area of the input piston 262 (equal to the area of a circle having a diameter equal to the inside diameter of the through hole formed through the second housing 254), and "R1" represents a reaction force of the presser piston 172, which acts on the auxiliary piston 250 via the connecting members 180. Therefore, the fluid pressure Pr in the first power chamber 48 and the fluid pressure Pf in the pressure chamber 28 are expressed by the above-indicated equations (1-5) and (1-6), respectively.

Where no pressure can be obtained in the second power chamber 52 due to a failure of the external hydraulic power source, the front end face of the first rod 260 comes into abutment on the front end of the second blind hole 188 of the auxiliary piston 250, when the advancing movement of the input piston 262 exceeds the predetermined axial clearance indicated above as a result of depression of the brake pedal 77. Thereafter, the auxiliary piston 250 is advanced with the input piston 262. When the auxiliary piston 250 is advanced by a predetermined distance toward the presser piston 172, the check valve 192 with the valve control mechanism is placed in the state for permitting the fluid flow only in the direction from the second power chamber 52 to the first power chamber 48.

With the brake pedal 77 kept depressed in the above condition, the input piston 262, auxiliary piston 250 and presser piston 172 have force balances expressed by the above-indicated equations (1-7), (2-4) and (1-10), respectively. In these equations, "R2" represents a mechanical reaction force of the auxiliary piston 250 which acts on the first rod 260, while "S2" represents the pressure receiving surface area of the auxiliary piston 250 and presser piston 172 (equal to the area of a circle having a diameter equal the inside diameter of the cylinder bore of the first housing 252). Therefore, the fluid pressure Pr in the first power chamber 48 and the fluid pressure Pf in the pressure chamber 28 are expressed by the equations (2-5) and (2-6), respectively.

While the external hydraulic power source is intact, advancing movements of the first rod 260 and the auxiliary piston 250 in abutting contact with each other cause the brake fluid to flow from the second power chamber 52 to the first power chamber 48, through the second blind hole 188, communication hole 190 and first blind hole 186, or through the cup seal 156.

Like the first embodiment, this fourth embodiment is adapted such that when the presser piston 172 and the auxiliary piston 250 are activated by the hydraulic pressure from the external hydraulic power source, this hydraulic pressure does not cause a reaction force which acts on the auxiliary piston 250 in the rearward direction. Accordingly, the pull force of the presser piston 172 required to advance the auxiliary piston 250 is relatively small. When the auxiliary piston 250 is advanced by the pull force generated by the presser piston 172, it is inevitable that the point at which the pull force acts on the auxiliary piston 250 is radially deviated off the axis of the piston 250. Hence, it is practically impossible to eliminate an increase in the friction force due to radial forces caused by the above radial deviation of the point of action of the pull force. Where the radial forces acting on the pistons 172, 250 are considerable, the outer circumferential surfaces and the inner cylinder bore surfaces of the pistons 172, 250 tend to be radially locally worn. In the present embodiment wherein the required pull force that acts on the auxiliary piston 250 is reduced to minimize the above-indicated radial forces, the sliding resistances of the presser and auxiliary pistons 172, 250 are reduced, whereby the durability of these pistons is improved.

While the present invention have been described in its presently preferred embodiments, it is to be understood that the invention may be embodied with various changes, modifications and improvements, for example, in connection with the master cylinder and control valve arrangements, which may occur to those skilled in the art, without departing from the spirit and scope of the invention.

What is claimed is:

1. A hydraulically operated braking system wherein a presser piston, and an input piston operated by a brake operating mechanism are fluid tightly and slidably fitted in a housing such that said presser and input pistons cooperate with said housing to define a pressure chamber in front of said presser piston, and a power chamber between said presser and input pistons, said power chamber being supplied with a brake fluid which is delivered from an external hydraulic power source, through a control valve which is operated based on a relative movement between said presser and input pistons, whereby a power pressure in said power chamber is controlled, said pressure chamber being connected to at least one brake cylinder of a first braking arrangement, while said power chamber is connected to at least one brake cylinder of a second braking arrangement, wherein the improvement comprises:

an auxiliary piston fluid tightly and slidably fitted in said housing such that said power chamber is divided into a first chamber between said presser and auxiliary pistons, and a second chamber between said auxiliary and input pistons;

a connecting mechanism connecting said auxiliary and presser pistons such that said connecting mechanism permits said auxiliary piston to approach said presser piston, and such that said auxiliary and presser pistons are normally spaced apart from each other by a predetermined maximum distance;

said auxiliary piston having a communication passage formed therethrough for fluid communication between said first and second chambers;

a shut-off valve provided in said communication passage, and having a closed position in which said communication passage is closed in a first state of said auxiliary and input pistons in which said auxiliary and input pistons are advanced as a unit in abutting contact with each other, and an open position in which said communication passage is open in a second state of said auxiliary and input pistons other than said first state;

check means disposed in parallel to said shut-off valve, and permitting a flow of the brake fluid in a first direction from said second chamber to said first chamber while inhibiting a flow of the brake fluid in a second direction opposite to said first direction;

said at least one brake cylinder of said second braking arrangement being connected to said first chamber, wherein said at least one brake cylinder of said first braking arrangement and said at least one brake cylinder of said second braking arrangement are activated by an operating force acting on said brake operating mechanism, which is imparted to said auxiliary piston through said input piston, when said power pressure is not obtained in said power chamber.

2. A hydraulically operated braking system according to claim 1, wherein said check means comprises a cup seal disposed on said auxiliary piston such that said cup seal is in contact with an inner surface which defines a cylinder bore formed in said housing.

3. A hydraulically operated braking system according to claim 1, wherein said check means comprises a check valve.

4. A hydraulically operated braking system according to claim 1, wherein said auxiliary piston has a cylindrical portion axially extending from an end face thereof on the side of said second chamber, said cylindrical portion being fitted in said housing while said input piston being fitted in said cylindrical portion.

5. A hydraulically operated braking system according to claim 1, wherein said auxiliary piston and said input piston are fitted directly in said housing.

6. A hydraulically operated braking system according to claim 1, wherein said shut-off valve comprises a valve seat provided in said communication passage, so as to face rearwardly of said auxiliary piston, and a valving member provided on said input piston such that said valving member faces said valve seat, said valving member being seated on said valve seat in said first state, and being spaced apart from said valve seat in said second state.

7. A hydraulically operated braking system according to claim 1, wherein said connecting mechanism comprises:
    a first engaging portion provided on one of said presser piston and said auxiliary piston;
    a second engaging portion provided on the other of said presser and auxiliary pistons, and engaging said first engaging portion such that said first and second engaging portions permit an axial relative movement between said presser and auxiliary pistons over a predetermined distance, and inhibits said axial relative movement exceeding said predetermined distance; and
    a spring interposed between said presser and auxiliary pistons, for biasing said presser and auxiliary pistons in opposite directions away from each other.

8. A hydraulically operated braking system according to claim 7, wherein said first engaging portion consists of a bolt which has a shaft portion, an externally threaded portion formed at one end of said shaft portion, and a head portion formed at the other end of said shaft portion, said second engaging portion consisting of a connecting member having a through hole which permits passage of said shaft portion of said bolt and which prevents passage of said head portion, said externally threaded portion of said first engaging portion being threaded to one of said presser piston and said auxiliary piston while said shaft portion is inserted in said through hole, said connecting member being fixed to the other of said presser and auxiliary pistons.

9. A hydraulically operated braking system according to claim 7, wherein said first engaging portion consists of a first protrusion having a first shaft portion which extends from one of said presser and auxiliary pistons coaxially with said one piston, and a first flange portion which extends from said first shaft portion in a radially outward direction,
    and wherein said second engaging portion comprises:
        a second protrusion having a second shaft portion which extends from the other of said presser and auxiliary pistons coaxially with said other piston, and a second flange portion which extends from said second shaft portion in a radially outward direction;
        a pair of semi-cylindrical members butted together into a split cylinder which has two inward flanges that are spaced apart from each other in an axial direction thereof; and
        an outer sleeve fitted on an outer circumferential surface of said split cylinder such that said first and second flange portions of said first and second protrusions are positioned within said split cylinder and such that said inward flanges prevent disengagement of said first and second flange portions from said split cylinder, said outer sleeve preventing said pair of semi-cylindrical members of said split cylinder from being separated from each other,
    at least one of said first and second shaft portions of said first and second protrusions having a length which permits a relative movement between said at least one of said first and second shaft portions and said split cylinder, in an axial direction of said split cylinder.

10. A hydraulically operated braking system according to claim 9, wherein said outer sleeve bears one end of said spring, thereby serving as a retainer for said spring.

11. A hydraulically operated braking system wherein a presser piston, and an input piston operated by a brake operating mechanism are fluid tightly and slidably fitted in a housing such that said presser and input pistons cooperate with said housing to define a pressure chamber in front of said presser piston, and a power chamber between said presser and input pistons, said power chamber being supplied with a brake fluid which is delivered from an external hydraulic power source, through a control valve which is operated based on a relative movement between said presser and input pistons, whereby a power pressure in said power chamber is controlled, said pressure chamber being connected to at least one brake cylinder of a first braking arrangement, while said power chamber is connected to at least one brake cylinder of a second braking arrangement, wherein the improvement comprises:

- an auxiliary piston fluid tightly and slidably fitted in said housing such that said power chamber is divided into a first chamber between said presser and auxiliary pistons, and a second chamber between said auxiliary and input pistons;
- a connecting mechanism connecting said auxiliary and presser pistons such that said connecting mechanism permits said auxiliary piston to approach said presser piston, and such that said auxiliary and presser pistons are normally spaced apart from each other by a predetermined maximum distance;
- said auxiliary piston having a communication passage formed therethrough for fluid communication between said first and second chambers;
- a valve device provided in said communication passage, an including a check valve and a valve control mechanism;
- said check valve inhibiting a flow of the brake fluid from said first chamber to said second chamber while permitting a flow of the brake fluid from said second chamber to said first chamber;
- said valve control mechanism preventing said check valve from functioning while said presser piston and said auxiliary piston are spaced apart from each other by said predetermined maximum distance, and permitting said check valve to function when said presser and auxiliary pistons approach each other by more than a predetermined distance;
- said at least one brake cylinder of said second braking arrangement being connected to said first chamber, whereby said at least one brake cylinder of said first braking arrangement and said at least one brake cylinder of said second braking arrangement are activated by an operating force acting on said brake operating mechanism, which is imparted to said auxiliary piston through said input piston, when said power pressure is not obtained in said power chamber.

12. A hydraulically operated braking system according to claim 11, wherein said check valve comprises a valve seat disposed in said communication passage so as to face frontwardly of said auxiliary piston, and a valving member biased in a direction toward said valve seat, said valving member being seated on said valve seat to close said check valve.

13. A hydraulically operated braking system according to claim 11, wherein said connecting mechanism comprises:
- a first engaging portion provided on one of said presser piston and said auxiliary piston;
- a second engaging portion provided on the other of said presser and auxiliary pistons, and engaging said first engaging portion such that said first and second engaging portions permit an axial relative movement between said presser and auxiliary pistons over a predetermined distance, and inhibits said axial relative movement exceeding said predetermined distance; and
- a spring interposed between said presser and auxiliary pistons, for biasing said presser and auxiliary pistons in opposite directions away from each other.

14. A hydraulically operated braking system according to claim 13, wherein said first engaging portion consists of a bolt which has a shaft portion, an externally threaded portion formed at one end of said shaft portion, and a head portion formed at the other end of said shaft portion, said second engaging portion consisting of a connecting member having a through hole which permits passage of said shaft portion of said bolt and which prevents passage of said head portion, said externally threaded portion of said first engaging portion being threaded to one of said presser piston and said auxiliary piston while said shaft portion is inserted in said through hole, said connecting member being fixed to the other of said presser and auxiliary pistons.

15. A hydraulically operated braking system according to claim 13, wherein said first engaging portion consists of a first protrusion having a first shaft portion which extends from one of said presser and auxiliary pistons coaxially with said one piston, and a first flange portion which extends from said first shaft portion in a radially outward direction, and wherein said second engaging portion comprises:
- a second protrusion having a second shaft portion which extends from the other of said presser and auxiliary pistons coaxially with said other piston, and a second flange portion which extends from said second shaft portion in a radially outward direction;
- a pair of semi-cylindrical members butted together into a split cylinder which has two inward flanges that are spaced apart from each other in an axial direction thereof; and
- an outer sleeve fitted on an outer circumferential surface of said split cylinder such that said first and second flange portion is of said first and second protrusions are positioned within said split cylinder and such that said inward flanges prevent disengagement of said first and second flange portions from said split cylinder, said outer sleeve preventing said pair of semi-cylindrical members of said split cylinder from being separated from each other,
- at least one of said first and second shaft portions of said first and second protrusions having a length which permits a relative movement between said at least one of said first and second shaft portions and said split cylinder, in an axial direction of said split cylinder.

16. A hydraulically operated braking system according to claim 15, wherein said outer sleeve bears one end of said spring, thereby serving as a retainer for said spring.

17. A hydraulically operated braking system wherein a presser piston, and an input piston operated by a brake operating mechanism are fluid tightly and slidably fitted in a housing such that said presser and input pistons cooperate with said housing to define a pressure chamber in front of said presser piston, and a power chamber between said presser and input pistons, said power chamber being supplied with a brake fluid which is delivered from an external hydraulic power source, through a control valve which is operated based on a relative movement between said presser and input pistons, whereby a power pressure in said power chamber is controlled, said pressure chamber being connected to at least one brake cylinder of a first braking arrangement, while said power chamber is connected to at least one brake cylinder of a second braking arrangement, wherein the improvement comprises:

an auxiliary piston fluid tightly and slidably fitted in said housing such that said power chamber is divided into a first chamber between said presser and auxiliary pistons, and a second chamber between said auxiliary and input pistons;

said auxiliary piston having a pressure receiving surface area with respect to said first chamber, which is smaller than that of said presser piston with respect to said first chamber;

a connecting mechanism connecting said auxiliary and presser pistons such that said connecting mechanism permits said auxiliary piston to approach said presser piston, and such that said auxiliary and presser pistons are normally spaced apart from each other by a predetermined maximum distance;

said auxiliary piston having a communication passage formed therethrough for fluid communication between said first and second chambers;

a valve device provided in said communication passage, said valve device inhibiting a flow of the brake fluid in a direction from said first chamber to said second chamber, in a first state of said auxiliary and input pistons in which said auxiliary and input pistons are advanced as a unit in abutting contact with each other, said valve device permitting flows of the brake fluid in opposite directions between said first and second chambers, in a second state of said auxiliary and input pistons other than said first state;

said at least one brake cylinder of said second braking arrangement being connected to said first chamber, whereby said at least one brake cylinder of said first braking arrangement and said at least one brake cylinder of said second braking arrangement are activated by an operating force acting on said brake operating mechanism, which is imparted to said auxiliary piston through said input piston, when said power pressure is not obtained in said power chamber.

18. A hydraulically operated braking system according to claim 17, wherein said connecting mechanism comprises:

a first engaging portion provided on one of said presser piston and said auxiliary piston;

a second engaging portion provided on the other of said presser and auxiliary pistons, and engaging said first engaging portion such that said first and second engaging portions permit an axial relative movement between said presser and auxiliary pistons over a predetermined distance, and inhibits said axial relative movement exceeding said predetermined distance; and a spring interposed between said presser and auxiliary pistons, for biasing said presser and auxiliary pistons in opposite directions away from each other.

19. A hydraulically operated braking system according to claim 18, wherein said first engaging portions consists of a bolt which has a shaft portion, an externally threaded portion formed at one end of said shaft portion, and a head portion formed at the other end of said shaft portion, said second engaging portion consisting of a connecting member having a through hole which permits passage of said shaft portion of said bolt and which prevents passage of said head portion, said externally threaded portion of said first engaging portion being threaded to one of said presser piston and said auxiliary piston while said shaft portion is inserted in said through hole, said connecting member being fixed to the other of said presser and auxiliary pistons.

20. A hydraulically operated braking system according to claim 18, wherein said first engaging portion consists of a first protrusion having a first shaft portion which extends from one of said presser and auxiliary pistons coaxially with said one piston, and a first flange portion which extends from said first shaft portion in a radially outward direction, and wherein said second engaging portion comprises:

a second protrusion having a second shaft portion which extends from the other of said presser and auxiliary pistons coaxially with said other piston, and a second flange portion which extends from said second shaft portion in a radially outward direction;

a pair of semi-cylindrical members butted together into a split cylinder which has two inward flanges that are spaced apart from each other in an axial direction thereof; and an outer sleeve fitted on an outer circumferential surface of said split cylinder such that said first and second flange portions of said first and second protrusions are positioned within said split cylinder and such that said inward flanges prevent disengagement of said first and second flange portions from said split cylinder, said outer sleeve preventing said pair of semi-cylindrical members of said split cylinder from being separated from each other, at least one of said first and second shaft portions of said first and second protrusions having a length which permits a relative movement between said at least one of said first and second shaft portions and said split cylinder, in an axial direction of said split cylinder.

21. A hydraulically operated braking system according to claim 20, wherein said outer sleeve bears one end of said spring, thereby serving as a retainer for said spring.

* * * * *